UNITED STATES PATENT OFFICE.

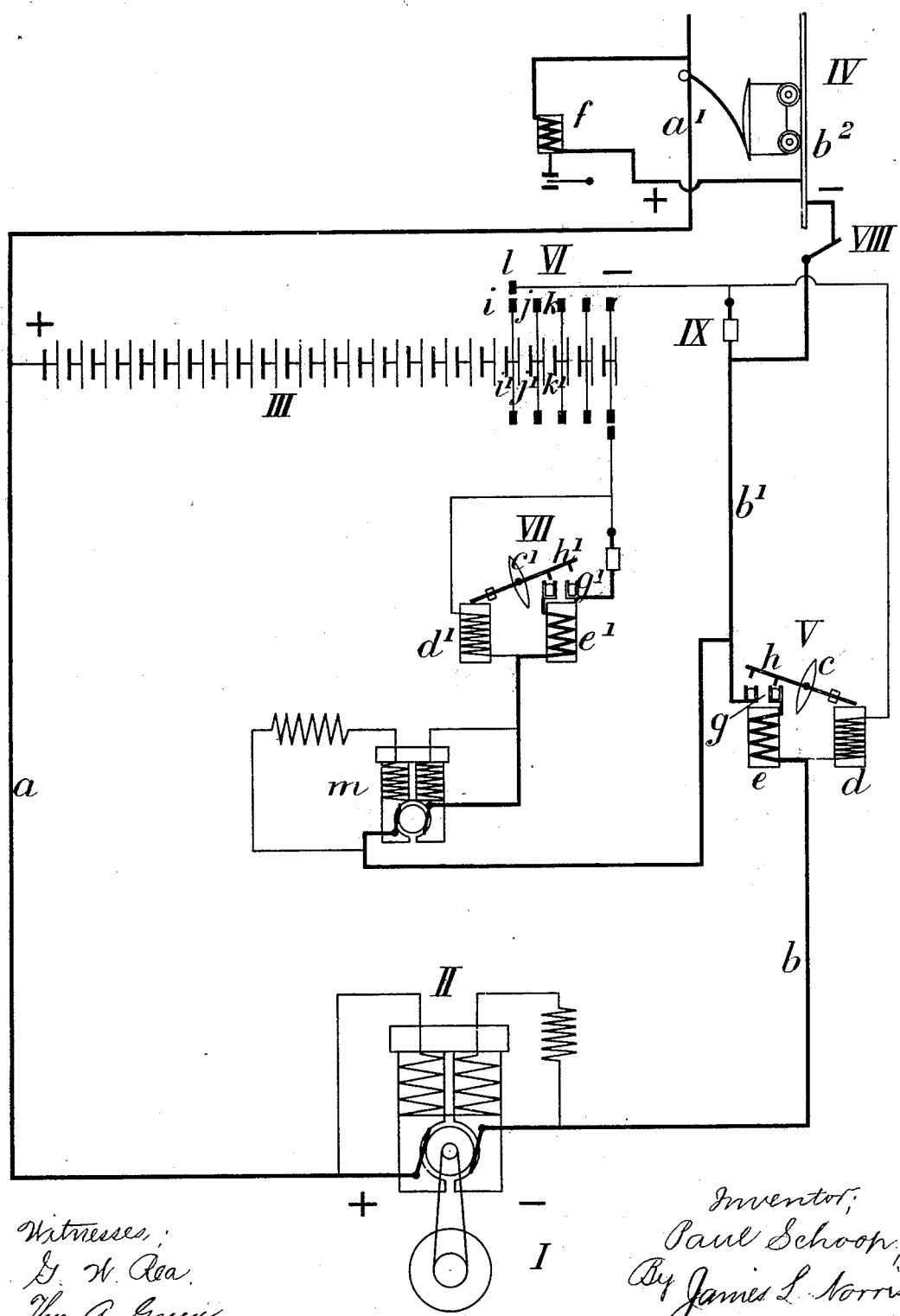

PAUL SCHOOP, OF ZURICH, SWITZERLAND.

ELECTRIC TRACTION APPARATUS.

SPECIFICATION forming part of Letters Patent No. 520,340, dated May 22, 1894.

Application filed October 30, 1893. Serial No. 489,546. (No model.)

*To all whom it may concern:*

Be it known that I, PAUL SCHOOP, electro-chemist, a citizen of Switzerland, residing at 90[II] Seestrasse, Zurich, Switzerland, have invented certain new and useful Improvements in Electric Traction Apparatus, of which the following is a specification.

This invention relates to an arrangement of an accumulator battery in combination with apparatus applicable to any of the known systems of electric traction, in such a manner as to economize power and provide for emergencies. As is well known, the fluctuation of the current during the working of an electric railway is very considerable, the power required at certain times being often twice or thrice the average power. Consequently the power- and generator-plant has to be provided on a large scale, the whole apparatus working on the average at only half or one third of its working capacity. Thus the first cost of plant is very high and its working is not of the most advantageous kind. A steam engine working with only one third of its full load, is more expensive in its work than if it were constantly at full load. The same holds good for the dynamo or electric generator. It has been already proposed to adopt for electric railways means similar to those adopted at electric light stations which are most economically worked, that is to say, an arrangement of accumulator batteries to take up the electric power at times when there is little expenditure and to give this stored up current off at times when the expenditure is greatest. A similar arrangement might be advantageously applied for electric traction, but, the circumstances being somewhat different from those of lighting stations, a peculiar arrangement and combination of battery, generator and line are necessary, the result being that an electric railway can be worked with a comparatively small power which is continuously charging the accumulator and this furnishes the necessary current which may be five times that produced by the power.

The arrangement consists of the following parts: first, the motor, which may be an engine, turbine, water wheel or windmill; second, the electric generator which is a shunt-wound dynamo for continuous current; third, the secondary battery; fourth, the electric line; fifth, an automatic switch which makes the connection between the dynamo and the accumulator, when the line does not take up all the current furnished by the dynamo, so that the superfluous current becomes stored in the battery, and this automatic switch also makes a break between the dynamo and the accumulator when the line absorbs the whole dynamo current; sixth, an automatic self-regulating switch for the accumulator battery, to maintain the tension of the battery at varying loads; seventh, an automatic switch like that described as fifth making connection and break for a small dynamo used only for charging those cells, connected with the automatic self regulating switch; eighth, an automatic break for the line; ninth, a safety fuse between the battery and the line.

The automatic switch (No. 5) is placed in the line from the negative terminal of the dynamo to the negative pole of the battery and also to the negative wire of the line. The other automatic switch (No. 7) is placed in the line from the negative terminal of the small dynamo, to the first cell, belonging to the automatic regulating switch. The regulating switch is placed at the end of the battery. The positive wire of the line is connected with the positive terminal of the dynamo and the positive pole of the battery while the negative wire of the line is in connection with the negative pole of the battery as well as with the negative terminal of the dynamo. The regulating switch is worked by a relay, and two ampère meters and a volt meter allow the control of the working of dynamo and battery together. I will describe the arrangement and operation of the several parts with reference to the accompanying drawings which shows a diagrammatic view of the parts in combination.

I is a suitable motor at the central station which drives a dynamo generator II, shunt wound for continuous current.

III is a secondary battery or accumulator, the positive lead *a* of the generator II being connected to the positive pole of the battery III and both to the positive conductor $a'$ of the electric railway IV. The negative terminal of the generator II is connected by a conductor $b$, automatic switch V and conductor $b'$ with the negative pole of the battery III which is connected through an automatic self regulating switch VI with the negative conductor or rails $b^2$ of the line through an automatic break VIII.

The automatic switch V consists of a permanent magnet $c$ pivoted between two electromagnets $d$ and $e$, of which $d$ is excited by a fine-wire coil permanently connected respectively with the negative conductor $b$ of the generator and the negative pole of the battery III, while the thick wire coil of the other $e$, is also connected with the conductor $b$. With the magnet $c$ is connected a contact arm $h$ whose fork can make contact with two mercury cups $g$, thereby connecting the conductors $b$ $b'$. When a current is passing through the fine wire coil of $d$ in the direction from the dynamo II to the battery III, $d$ attracts the magnet $c$, and thereby causes the fork $h$ to close the connection, and the current now passing through the electromagnet $e$ causes this to repel the magnet $c$ and thus keep the arm in the described position. When a current passes in the reverse direction through the fine wire coil of $d$, this repels the magnet $c$, while $e$ attracts it, and causes the communication between $b$ $b'$ to be broken again. Thus when the tension of the dynamo II is higher than that of the battery the switch V will establish the communication between the two and the battery will be charged with the amount of current from the dynamo in excess of the load on the railway IV; when, on the other hand, the tension of the dynamo sinks below that of the battery, a current will flow from the battery to the dynamo through the fine wire coil $d$, and will thereby break the connection. This action may be repeated many times during every hour when the line is in operation.

The automatic switch VI for maintaining the tension of the battery constant with varying loads consists of a certain number of contacts $i, j, k,$ &c., each connected with one of the regulating cells $i', j', k',$ of the battery III, and a sliding contact $l$ in connection with the line $b'$, and caused to slide over the said contacts by moving it by hand. The relay $f$ is a line-protector, consisting either of a simple lead-wire acting as a safety-fuse, or of an automatic switch worked by a coil, so that if the current surpasses a certain amount, the break is automatically performed, the arrangement being such that according as the tension on the line falls below or rises above a certain point, the movable contact $l$ of the regulating switch is made to slide to the one side or the other, thereby adding to or cutting out regulating cells of the battery and thus keeping the tension of the line practically constant. The regulating cells $i j k$, &c., are charged by a small auxiliary dynamo $m$ driven by a suitable motor, one pole of which dynamo is connected through the lead $b'$, with the positive pole of the regulating cells, while the other pole is connected with the negative pole of the regulating cells of the battery through the automatic regulating switch VII, which is constructed and operates in precisely the same manner as the switch V, that is to say, when the tension of dynamo $m$ is greater than that of the battery, a current passing through the thin wire coil of the electro magnet coil $d'$ causes this to attract the pivoted permanent magnet $c'$, whereby the fork of the arm $h'$ makes contact with the mercury cups $g'$, thus closing the communication between the dynamo and the battery this being maintained by the repulsion exercised on the magnet $c'$ by the electro magnet $e'$. When, on the other hand, the tension of the battery is greater than that of the dynamo, the direction of the current will be reversed, thereby reversing the switch and breaking the communication between the dynamo and battery. A fuse IX is provided between the battery III and the line.

The battery need not have a very large capacity as its main merit and work is to regulate, being constantly charged and discharged at very short intervals, which may be only a few seconds. At the same time the battery furnishes a reserve for cases where a stoppage of the machinery occurs, as it can then provide the line with the necessary current for a time.

I am aware that it has already been proposed to combine a secondary battery with the so called trolley system in order to obtain economical results; also that there are various arrangements of automatic switches for making and breaking electrical connections, and I do not claim these features as, of themselves, constituting my invention.

By my invention I am enabled to work a tram line with only a fractional part—say one third—of the power necessary for the maximum load of the railway, which has never been accomplished before, and which enables a great economy to be effected as compared with the usual system in which powerful engines are employed which are capable of producing the maximum power required, and which, for the greater part of the time are only working at a fractional part of such maximum power, and consequently in a very economical manner.

Having thus described the nature of my said invention and the best means I know for carrying the same into practical effect, I claim—

In an electric railway, the combination of an electric generator, a secondary battery charged by the generator through an automatic switch, an auxiliary electric generator connected to regulating cells on the secondary battery by an automatic switch connecting them when the tension of such generator exceeds that of the said cells, and a regulating switch with sliding contacts working between the two poles of the railway, so as to include or cut out regulating cells of the battery for the purpose of maintaining the tension of the electric railway practically constant with a varying load, substantially as described.

In witness whereof I have signed my name to this specification, in the presence of two subscribing witnesses, this 12th day of October, A. D. 1893.

PAUL SCHOOP.

Witnesses:
H. RABHART,
K. ZELLER.